United States Patent
Brooks, Jr. et al.

(10) Patent No.: US 12,474,752 B2
(45) Date of Patent: Nov. 18, 2025

(54) DOCKED COOLING CONTROL FOR A HANDHELD INFORMATION HANDLING SYSTEM

(71) Applicant: Dell Products L.P., Round Rock, TX (US)

(72) Inventors: Robert C. Brooks, Jr., Houston, TX (US); Daniel L. Hamlin, Round Rock, TX (US); Adolfo S. Montero, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 168 days.

(21) Appl. No.: 17/749,416

(22) Filed: May 20, 2022

(65) Prior Publication Data

US 2023/0400896 A1    Dec. 14, 2023

(51) Int. Cl.
*G06F 1/20* (2006.01)
*G05B 19/4155* (2006.01)
*G06F 1/16* (2006.01)

(52) U.S. Cl.
CPC ......... *G06F 1/203* (2013.01); *G05B 19/4155* (2013.01); *G06F 1/1632* (2013.01); *G06F 1/206* (2013.01); *G05B 2219/49216* (2013.01)

(58) Field of Classification Search
CPC ........ G06F 1/203; G06F 1/1632; G06F 1/206; G05B 19/4155; G05B 2219/49216
See application file for complete search history.

(56) References Cited

U.S. PATENT DOCUMENTS

| | | | |
|---|---|---|---|
| 9,952,636 B2 | 4/2018 | Montero et al. | |
| 10,108,236 B2 | 10/2018 | Peterson et al. | |
| 2002/0126431 A1* | 9/2002 | Yanagisawa | G06F 1/1632 361/103 |
| 2009/0002939 A1* | 1/2009 | Baugh | G06F 1/206 361/679.48 |
| 2017/0168531 A1* | 6/2017 | Casparian | G06F 1/206 |
| 2017/0219240 A1* | 8/2017 | Cassini | G06F 1/206 |
| 2018/0011521 A1* | 1/2018 | Ingalls | H05K 7/20727 |
| 2020/0383235 A1* | 12/2020 | Yu | H05K 7/20136 |
| 2021/0149465 A1* | 5/2021 | Hiltner | G06F 1/206 |

* cited by examiner

*Primary Examiner* — Zhipeng Wang
(74) *Attorney, Agent, or Firm* — Larson Newman, LLP

(57) ABSTRACT

An information handling system includes a storage that stores a thermal table associated with the information handling system. A processor detects that the information handling system is connected to a dock. In response to the information handling system being connected to the dock, the processor provides a dock temperature request to the dock. The processor receives a first temperature value for the dock, and receives a second temperature value for the information handling system. The processor retrieves thermal table data from the thermal table. The processor generates a first fan control signal based on the first and second temperature values and the thermal table data, and provides the first fan control signal to the dock.

18 Claims, 5 Drawing Sheets

DOCKED COOLING CONTROL FOR A HANDHELD INFORMATION HANDLING SYSTEM

FIELD OF THE DISCLOSURE

The present disclosure generally relates to information handling systems, and more particularly relates to docked cooling control for a handheld information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system may include a storage that stores a thermal table associated with the information handling system. A processor may communicate with the storage. The processor may detect that the information handling system is connected to a dock. In response to the information handling system being connected to the dock, the processor may provide a dock temperature request to the dock. The processor may receive a first temperature value for the dock, and receive a second temperature value for the information handling system. The processor may retrieve thermal table data from the thermal table. The processor may generate a first fan control signal based on the first and second temperature values and the thermal table data, and provide the first fan control signal to the dock.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
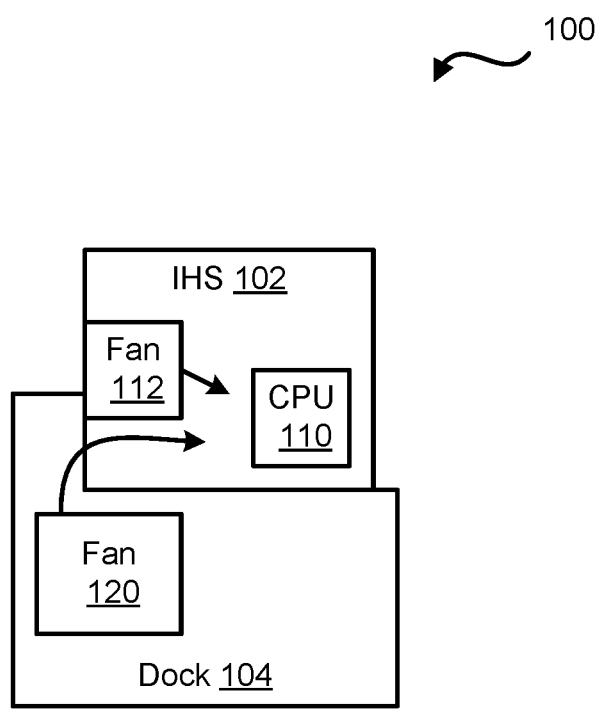
FIG. 1 is a block diagram of an information handling system in physical communication with a dock according to at least one embodiment of the present disclosure.

FIG. 1 illustrates a system 100 including an information handling system 102 in physical communication with a dock 104 according to at least one embodiment of the present disclosure. Information handling system 102 includes a fan 112, a processor 110, and multiple other components not illustrated in FIG. 1 including, but not limited to, the components illustrated in FIG. 2. Dock 104 includes a fan 120 and multiple other components not illustrated in FIG. 1 including, but not limited to, the components illustrated in FIG. 2. Information handling system 102 may be any suitable device, such as a handheld gaming device or the like. In certain examples, information handling system 102 may include any suitable number of cooling fans greater than the single fan 112 illustrated in FIG. 1 without varying from the scope of this disclosure. Similarly, dock 104 may include any suitable number of cooling fans greater than the single fan 120 illustrated in FIG. 1 without varying from the scope of this disclosure.

In an example, a thermal design power (TDP) of processor 110 of information handling system 102 may be set to different values based on one or more conditions for the information handling system. In certain examples, the possible conditions may include, but are not limited to, information handling system 102 being in a direct current (DC) mode, the information handling system being an alternating current (AC) mode, and the information handling system being docked with dock 104. In an example, the TDP for processor 110 may be any suitable value, such as 20 W when information handling system 102 is in the DC mode, 28 W when the information handling system is in the AC mode, 45 W when the information handling system is docked with dock 104, or the like. One of ordinary skill in the art would recognize that the TDP values stated above are non-limiting examples, and the TDP values for processor 110 may be any other suitable value without varying from the scope of this disclosure.

In certain examples, processor 110 of information handling system 102 may execute an application that is capable of drawing a full amount of power allowed by the TDP of the processor. However, if processor 110 executes this application on a sustained basis, internal fan 112 may not be capable of delivering enough airflow to meet thermal specifications for the processor at an acceptable acoustic level. In this example, fan 120 in dock 104 may be designed and positioned to deliver the additional cooling to CPU 110 when information handling system 102 is docked with the dock, such as via a docked mode. In an example, information handling system 102 may be improved by thermal controls to provide additional cooling capacity to processor 110 while the processor is operating at full power and the information handling system is docked with dock 104 as will be described herein.

In previous systems, a cooling fan in a dock to support additional cooling of components within a docked information handling system may operate in one of two possible modes. For example, the cooling fan in the dock may run at a maximum rotations per minute (RPM) to ensure that components in the information handling system are receiving needed cooling, or a user of the docked information handling system may manually adjust the RPM setting of the cooling fan in the dock to meet a particular preference of the user. The user manual control of the cooling fan or running the fan at a maximum RPM may be either too much of a distraction or introduce an increased acoustic impact.

Information handling system 102 and dock 104 may be improved by one or more components of the information handling system directly controlling the RPMs of cooling fan 104 in the dock, such that proper cooling airflow may be provided to the information handling system while the acoustics of the cooling fan are kept as low as possible as will be described herein.

Figure 2:
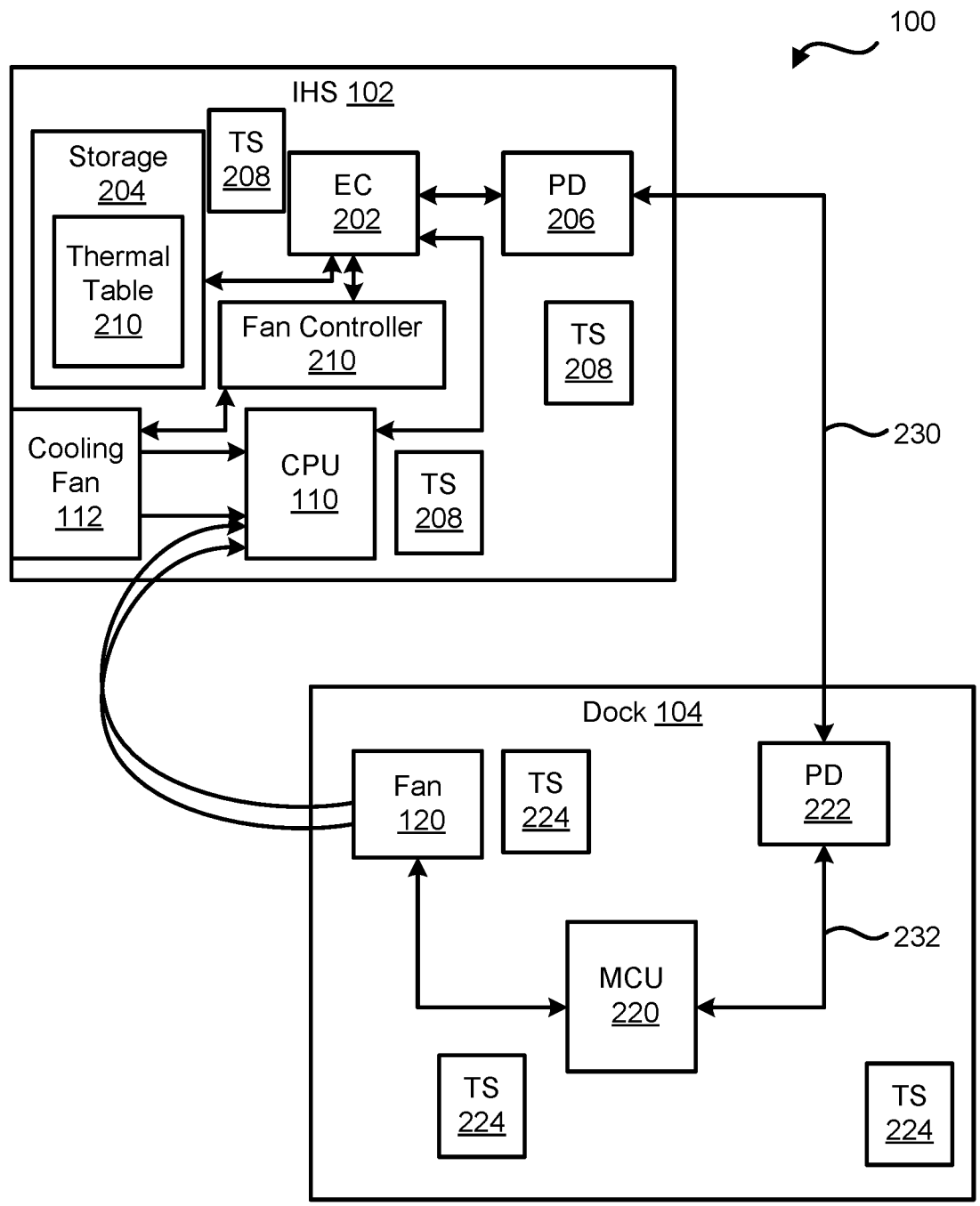
FIG. 2 is a block diagram of different components of the information handling system and the dock according to at least one embodiment of the present disclosure.

FIG. 2 illustrates information handling system 102 and dock 104 of system 100 according to at least one embodiment of the present disclosure. As shown in FIG. 2, information handling system 102 includes an embedded controller 202, a storage 204, a power delivery port 206, one or more thermal sensors 208, a fan controller 210, processor 110, and cooling fan 112. In an example, storage 204 may be any suitable storage including, but not limited to, a non-volatile memory. In certain examples, storage 204 may be separate from embedded controller 202, as shown in FIG. 2, or may be incorporated within the embedded controller without varying from the scope of this disclosure. Dock 104 includes a processor 220, such as a microcontroller unit, a power delivery port 222, one or more thermal sensors 224, and fan 120. In certain examples, information handling system 102 may include any suitable number of thermal sensors 208, and the thermal sensors may be located at different locations with the information handling system. Similarly, dock 104 may include any suitable number of thermal sensors 224, and the thermal sensors may be located at different locations with the dock.

When docked and in a docked mode, information handling system 102 may be electronically connected to dock 104 via a cable 230, and the cable may be connected to power delivery port 206 and power delivery port 222. In an example, cable 230 may be any suitable type of cable, such as a universal serial bus (USB) type-C cable. In this example, power delivery ports 206 and 222 may be USB type-C ports. In certain examples, power delivery ports 206 and 222 may provide a single connection between information handling system 102 and dock 104, such that a small/flexible form-factor may be utilized between the information handling system and the dock. In this example, embedded controller 202 may leverage vendor defined message (VDM) messaging on cable 230 as a unique and efficient transport layer to communicate with processor 220 that may be in control of fan 120 in dock 104. The VDMs provided by embedded controller 202 may be transmitted over any suitable communication line of cable 230 including, but not limited to, a CC line of USB type-C connectors. In an example, the CC line may be a super speed USB signal pin of power delivery ports 206 and 222. The VDMs may include thermal control signals that are provided via bidirectional communications. Additionally, the communication between embedded controller 202 and processor 220 may be provided in a closed loop communication to enable thermal tables 210 to create more efficient thermal controls.

When information handling system 102 is undocked, embedded controller 202 may utilize only fan 112 to cool processor 110 based on settings in thermal table 210 and the TDP of the processor. In an example, if a thermal trigger event set within thermal table 210 is detected, embedded control 202 may throttle processor 110 in any suitable manner. For example, embedded controller may reduce or throttle processor 110 from a first power level to a second power level, and based on this reduction in the power level a CPU/GPU performance may also be reduced. In an example, the performance reduction may result in a reduced gaming experience.

In an example, embedded controller 202 may actively control an amount of cooling delivered by fan 120 of dock 104. Based on the additional airflow from fan 120, embedded controller 202 may utilize fan controller 210 to set a fan speed to control fan 112 to run at a lower RPM and the combination of airflows may provide sufficient cooling to processor 110. Thus, the combination of airflow from fan 112 and airflow from fan 120 may enable processor 110 to deliver higher performance at the same fan acoustic level. In an example, the combination of airflow from fan 112 and airflow from fan 120 may also improve acoustics of information handling system 102 and dock 104 while enabling processor 110 to execute at the same performance level. In this example, processor 110 executing at this same performance with lower fan acoustics may be possible because fans 112 and 120 may each run at a lower RPM and deliver the same amount of cooling airflow as compared to fan 112 in a stand alone mode. Additionally, embedded controller 202 may allow a customized user selected blend or tradeoff between performance of processor 110 and fan acoustic levels of fans 112 and 120 as set in thermal table 210.

In certain examples, embedded controller 202 may execute any suitable thermal control algorithms to leverage a thermal infrastructure/framework within information handling system 102. In an example, embedded controller 202 may utilize thermal sensors 208 and 224 to drive fan 120 in dock 104 based on data in thermal table 210. In certain examples, data from thermal sensors 224 may be made available to embedded controller 202 for use with data in thermal table 210. However, if dock 104 does not include thermal sensors 224, embedded controller may drive fan 120 based on data from thermal sensors 208 and thermal table 210. In an example, data from thermal sensors 224 and other control points of dock 104 may be provided to a firmware handler of embedded controller 202 via the abstraction allowed through the VDM layer of cable 230. In certain examples, embedded controller 202 may also utilize any other thermal control components available in information handling system 102 and dock 104, as well a thermal graphical user interface (GUI) without varying from the scope of this disclosure.

Thus, embedded controller 202 may utilize an active closed-loop control of fan 120 in dock 104 to improve performance of processor 110 and acoustics of fans 112 and 120 when information handling system 102 is docked with the dock. For example, embedded controller 202 may enable processor 110 to have a higher performance with only a necessary amount of RPM/acoustics needed in fans 112 and 120 rather than running fan 120 of dock 104 at a maximum speed all the time.

Figure 3:
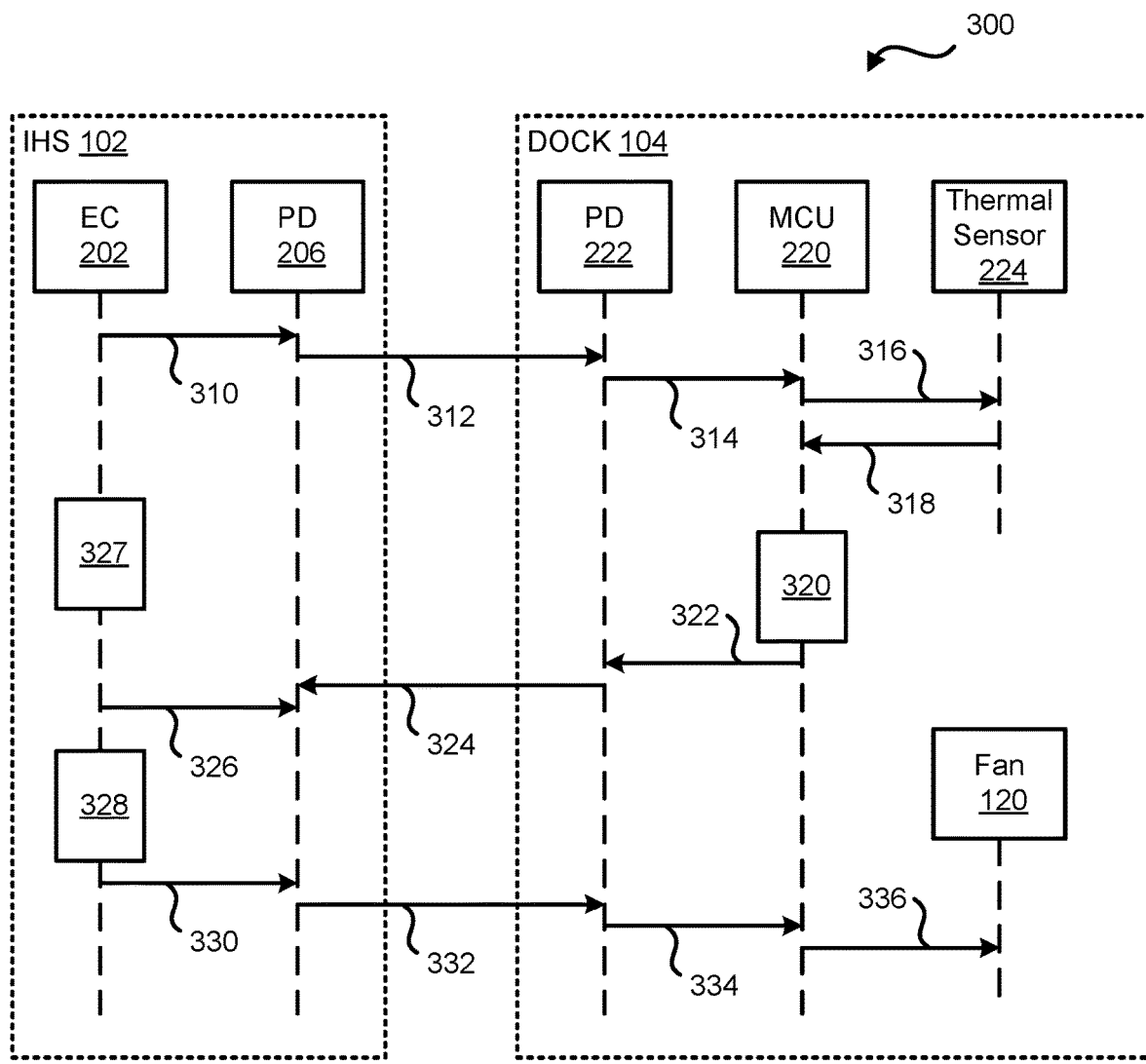
FIG. 3 is a flow diagram of a method for controlling cooling of a docked handheld information handling system according to at least one embodiment of the present disclosure.

FIG. 3 shows a method 300 for controlling cooling of a docked handheld information handling system, such as information handling system 102, according to at least one embodiment of the present disclosure. It will be readily appreciated that not every method step set forth in this flow diagram is always necessary, and that certain steps of the methods may be combined, performed simultaneously, in a different order, or perhaps omitted, without varying from the scope of the disclosure. The steps or operations of method 300 may be performed by any suitable components, such as embedded controller 202 and power delivery port 206 of information handling system 102, and power delivery port 222, processor 220, thermal sensors 224, and fan 120 of dock 104.

At operation 310, embedded controller 202 may provide a get temperature request to power delivery port 206. In an example, the get temperature request may be provided from embedded controller 202 to power delivery port 206 via any suitable protocol, such as a VDM message over an I2C communication protocol. At operation 312, power delivery port 206 may provide the get temperature request to power delivery port 222 of dock 104. For example, power delivery port 206 may provide the request as a VDM message over the CC line of a USB type-C connection between power delivery ports 206 and 222.

At operation 314, power delivery port 222 may provide the get temperature request to processor 220. In an example, the get temperature request may be provided from power delivery port 222 to processor 220 via any suitable protocol, such as a VDM message over an I2C communication protocol. At operation 316, processor 220 may provide the get temperature request to thermal sensors 224.

In response to the get temperature request, thermal sensors 224 may provide temperature data to processor 220 at operation 318. At operation 320, processor 220 may process the temperature data from one or more temperature sensors 224 in dock 104 to create a temperature reading signal. At operation 322, processor 220 may provide the temperature reading to power delivery port 222. In an example, the temperature reading may be provided from processor 220 to power delivery port 222 via any suitable protocol, such as a VDM message over an I2C communication protocol.

At operation 324, power delivery port 222 may provide the temperature reading to power delivery port 206 via a VDM message over the CC line of a USB type-C connection between the power delivery ports. At operation 326, the temperature reading may be provided from power delivery port 206 to embedded controller 202. At operation 327, embedded controller 202 may communicate with temperature sensors within information handling system 102 to receive temperature values for different locations within the information handling system, such as temperature values near processor 110 and near fan 112 of FIGS. 1 and 2, and any other suitable location within information handling system 102. In certain examples, operation 327 may be performed at any suitable point within method 300, such as after operation 326, substantially in parallel with operations 310-326, or the like.

At operation 328, embedded controller 202 may execute one or more additional operations to generate a fan control signal for fan 120 in dock 104 as will be described in detail with respect to FIG. 3. At operation 330, the fan control signal is provided from embedded controller 202 to power delivery port 206. In an example, the fan control signal may be provided from embedded controller 202 to power delivery port 206 via any suitable protocol, such as a VDM message over an I2C communication protocol. At operation 332, power delivery port 206 may provide the fan control signal to power delivery port 222 of dock 104. For example, power delivery port 206 may provide the signal as a VDM message over the CC line of a USB type-C connection between power delivery ports 206 and 222.

At operation 334, power delivery port 222 may provide the fan control signal to processor 220. At operation 336, processor 220 may provide the fan control signal to one or more fans 120 via any suitable protocol, such as a VDM message over an I2C communication protocol. In certain examples, one or more fans 120 may operate according to the fan control signal. For example, the fan control signal may be utilized to set a PWM signal for fan 120, which in turn may control the additional airflow provided to information handling system 102.

In certain examples, the communications between embedded controller 202 and processor 220 may be made via bidirectional VDM messaging over the USB-C interface to carry thermal/fan information, which in turn may allow embedded controller 202 to remotely control the amount of cooling fan 120 of dock 104 delivers to information handling system 102.

Figure 4:
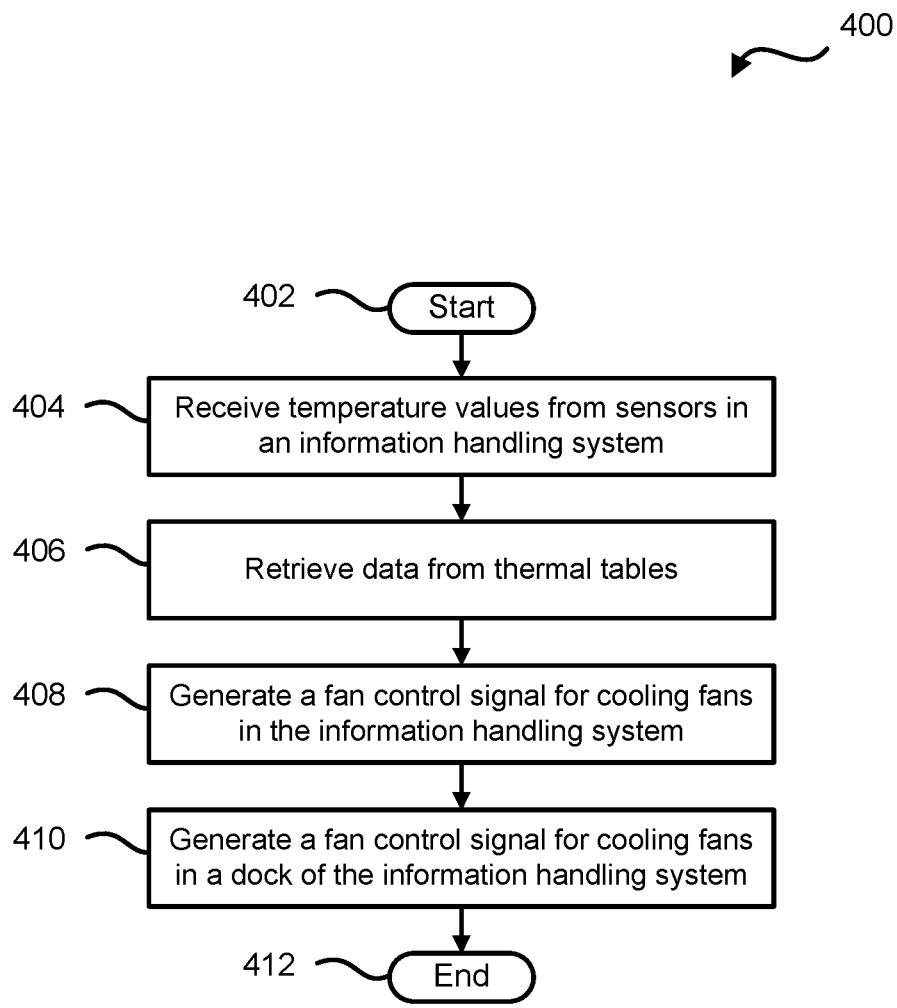
FIG. 4 is a flow diagram of a method for generating cooling fan signals for the docked handheld information handling system according to at least one embodiment of the present disclosure.

FIG. 4 illustrates a method 400 for generating cooling fan signals for the docked handheld information handling system according to at least one embodiment of the present disclosure, starting at block 402. In an example, the method 400 may be substantially equal to the operations 328 of FIG. 3. It will be readily appreciated that not every method step set forth in this flow diagram is always necessary, and that certain steps of the methods may be combined, performed simultaneously, in a different order, or perhaps omitted, without varying from the scope of the disclosure.

At block 404, temperature values may be retrieved from thermal sensors within an information handling system. In an example, the temperature values may be associated with different locations within the information handling system. At block 406, data from a thermal table is retrieved. In an example, the data or setting within the thermal table may include user settings to create a balance between thermals of processor 110 and acoustics of fans 112 and 120. In certain examples, the thermal table may include data to correlate a specific fan speed for fans 112 and 120 based on a TDP for processor 110. In an example, the thermal table may include a user input to select a user desired tradeoff between thermal cooling of processor 110 and the acoustics generated by fans 112 and 120. The thermal table may further include any additional data to be utilized by embedded controller 202 to set fan control signals.

At block 408, a fan control signal for one or more cooling fans in the information handling system are generated. In an example, an embedded controller of the information handling system may generate the fan control signal for the fans of information handling system based on the data in the thermal tables. In certain examples, the fan control signals for the cooling fans of the information handling system may be provided as PWM signals from the embedded controller to the one or more cooling fans. At block 410, a fan control signal for one or more cooling fans of a dock of the information handling system may be generated, and the flow ends at block 412. In an example, the embedded controller of the information handling system may generate the fan control signal for the fans of the dock based on the data in the thermal tables. In certain examples, the fan control signals for the cooling fans of the dock may be provided from the embedded controller to a processor of the dock, which in turn may provide the fan control signals as PWM signals to the one or more cooling fans. These fan control signals may set a fan speed of the one or more fans within the dock to provide additional airflow to a processor of the information handling system.

Figure 5:
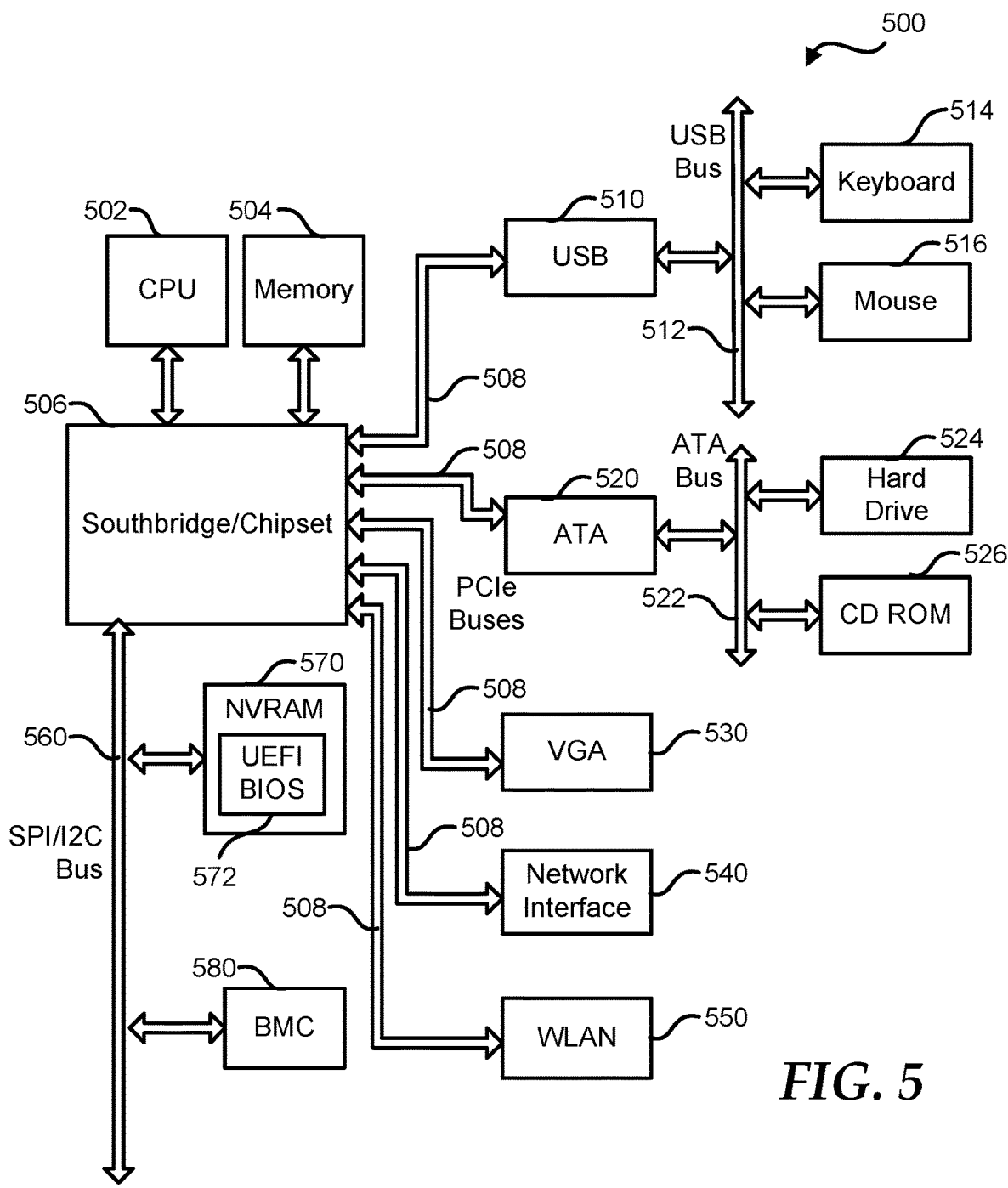
FIG. 5 is a block diagram of a general information handling system according to an embodiment of the present disclosure.

FIG. 5 illustrates a general information handling system 500. For purpose of this disclosure information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price.

Information handling system 500 includes a processor 502, a memory 504, a chipset 506, a PCI bus 508, a universal serial bus (USB) controller 510, a USB 512, a keyboard device controller 514, a mouse device controller 516, an ATA bus controller 520, an ATA bus 522, a hard drive device controller 524, a compact disk read only memory (CD ROM) device controller 526, a video graphics array (VGA) device controller 530, a network interface controller (NIC) 540, a wireless local area network (WLAN) controller 550, a serial peripheral interface (SPI) bus 560, a flash memory device 570 for storing UEFI BIOS code 572, and a baseboard management controller (BMC) 580. BMC 580 can be referred to as a service processor, and embedded controller, and the like. Flash memory device 570 can be referred to as a SPI flash device, BIOS non-volatile random access memory (NVRAM), and the like. BMC 580 is configured to provide out-of-band access to devices at information handling system 500. As used herein, out-of-band access herein refers to operations performed without support of CPU 502, such as prior to execution of UEFI BIOS code 572 by processor 502 to initialize operation of system 500.

Information handling system 500 can include additional components and additional busses, not shown for clarity. For example, system 500 can include multiple processor cores, audio devices, and the like. While a particular arrangement of bus technologies and interconnections is illustrated for the purpose of example, one of skill will appreciate that the techniques disclosed herein are applicable to other system architectures. System 500 can include multiple CPUs and redundant bus controllers. One ore more components can be integrated together. For example, portions of chipset 506 can be integrated within CPU 502. In an embodiment, chipset 506 can include a platform controller hub (PCH). System 500 can include additional buses and bus protocols, for example I2C and the like. Additional components of information handling system 500 can include one or more storage devices that can store machine-executable code, one or more communications ports for communicating with external devices, and various input and output (I/O) devices, such as a keyboard, a mouse, and a video display.

For purposes of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 500 can include processing resources for executing machine-executable code, such as CPU 502, a programmable logic array (PLA), an embedded device such as a System-on-a-Chip (SoC), or other control logic hardware. Information handling system 500 can also include one or more computer-readable medium for storing machine-executable code, such as software or data.

UEFI BIOS code 572 can be referred to as a firmware image, and the term BIOS is herein used interchangeably with the term firmware image, or simply firmware. In an embodiment, UEFI BIOS 572 can be substantially compliant with one or more revisions of the Unified Extensible Firmware Interface (UEFI) specification. As used herein, the term Extensible Firmware Interface (EFI) is used synonymously with the term UEFI. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the OS. The UEFI specification allows for the extension of platform firmware by loading UEFI driver and UEFI application images. For example, an original equipment manufacturer can include customized or proprietary images to provide enhanced control and management of the information handling system 500. While the techniques disclosed herein are described in the context of a UEFI compliant system, one of skill will appreciate that aspects of the disclosed systems and methods can be implemented at substantially any information handling system having configurable firmware.

UEFI BIOS code 572 includes instructions executable by CPU 502 to initialize and test the hardware components of system 500, and to load a boot loader or an operating system (OS) from a mass storage device. UEFI BIOS code 572 additionally provides an abstraction layer for the hardware, i.e. a consistent way for application programs and operating systems to interact with the keyboard, display, and other input/output devices. When power is first applied to information handling system 500, the system begins a sequence of initialization procedures. During the initialization sequence, also referred to as a boot sequence, components of system 500 are configured and enabled for operation, and device drivers can be installed. Device drivers provide an interface through which other components of the system 500 can communicate with a corresponding device.

The storage capacity of SPI flash device 570 is typically limited to 32 MB or 54 MB of data. However, original equipment manufacturers (OEMs) of information handling systems may desire to provide advanced firmware capabilities, resulting in a BIOS image that is too large to fit in SPI flash device 570. Information handling system can include other non-volatile flash memory devices, in addition to SPI flash device 570. For example, memory 504 can include non-volatile memory devices in addition to dynamic random access memory devices. Such memory is referred to herein as non-volatile dual in-line memory module (NVDIMM) devices. In addition, hard drive 524 can include non-volatile storage elements, referred to as a solid state drive (SSD). For still another example, information handling system 500 can include one or more non-volatile memory express (NVMe) devices. Techniques disclosed herein provide for storing a portion of a BIOS image at one or more non-volatile memory devices in addition to SPI flash device 570.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a storage configured to store a thermal table associated with the information handling system;
   a processor to communicate with the storage, the processor to:
   detect that the information handling system is connected to a dock;
   in response to the information handling system being connected to the dock, provide a dock temperature request to the dock;
   receive a first temperature value for the dock when the dock includes at least one thermal sensor, wherein communication between the information handling system and the dock is a closed loop communication;
   receive a second temperature value for the information handling system;
   determine whether an acoustic level is met when thermal specifications are met based on the second temperature value;
   retrieve thermal table data from the thermal table;
   in response to the acoustic level not being met:
   when the first temperature value is received, generate first and second fan control signals based on the first and second temperature values and the thermal table data; and
   when the first temperature value is not received, generate the first and second fan control signals based on the second temperature value and the thermal table data; and
   provide the first fan control signal to the dock, wherein based on the first fan control signal, the processor remotely controls an amount of cooling provided to the information handling system by a first airflow of a first cooling fan in the dock; and
   a second cooling fan to provide a second airflow based on the second fan control signal, wherein the first and second airflows are provided to the information handling system without the acoustic level being exceeded.

2. The information handling system of claim 1, further comprising a power delivery port of a universal serial bus type-c connection, wherein the power delivery port provides communication signals between the processor and the dock.

3. The information handling system of claim 2, wherein the communication signals include the dock temperature request and the first fan control signal.

4. The information handling system of claim 1, further comprising a fan controller to communicate with the processor, the fan controller to set a fan speed for the second cooling fan based on the second fan control signal.

5. The information handling system of claim 1, wherein a first fan speed of the first cooling fan in the dock is set based the first fan control signal, and a second fan speed of the second cooling fan in the information handling system is set based on the second fan control signal.

6. The information handling system of claim 5, wherein the first fan speed of the first cooling fan and the second fan speed of the second cooling fan combine to provide a total amount of cooling needed based on a thermal design power of the information handling system.

7. The information handling system of claim 1, wherein the processor is an embedded controller of the information handling system.

8. A method comprising:
   detecting, by a processor of an information handling system, that the information handling system is connected to a dock;
   in response to the information handling system being connected to the dock, providing a dock temperature request to the dock;
   receiving a first temperature value for the dock when the dock includes at least one thermal sensor, wherein communication between the information handling system and the dock is a closed loop communication;
   receiving a second temperature value for the information handling system;
   determining whether an acoustic level is met when thermal specifications are met based on the second temperature value;
   retrieving thermal table data;
   in response to the acoustic level not being met:
   when the first temperature value is received, generating first and second fan control signals based on the first and second temperature values and the thermal table data; and
   when the first temperature value is not received, generating the first and second fan control signals based on the second temperature value and the thermal table data;
   providing the first fan control signal to the dock, wherein based on the first fan control signal, the processor remotely controls an amount of cooling provided to the information handling system by a first airflow of a first cooling fan in the dock; and
   providing, by a second cooling fan, a second airflow based on the second fan control signal, wherein the first and second airflows are provided to the information handling system without the acoustic level being exceeded.

9. The method of claim 8, further comprising based on the second fan control signal, setting a fan speed for the second cooling fan of the information handling system.

10. The method of claim 9, wherein a first fan speed of the first cooling fan in the dock is set based the first fan control signal, and the second fan speed of a second cooling fan in the information handling system is set based on the second fan control signal.

11. The method of claim 10, wherein the first fan speed of the first cooling fan and the second fan speed of the second cooling fan combine to provide a total amount of cooling needed based on a thermal design power of the information handling system.

12. The method of claim 8, wherein the providing of the dock temperature request is provided via a power delivery port of a universal serial bus type-c connection.

13. The method of claim 12, wherein the communication signals include the dock temperature request and the first fan control signal.

14. The method of claim 7, wherein the processor is an embedded controller of the information handling system.

15. A method comprising:
if an information handling system is connected to a dock and the dock includes at least one thermal sensor, then receiving a first temperature value from the dock and receiving a second value from a thermal sensor of the information handling system, wherein communication between the information handling system and the dock is a closed loop communication;
if the information handling system is connected to the dock and the dock does not include at least one thermal sensor, then receiving the second value from the thermal sensor of the information handling system;
determining whether an acoustic level is met when thermal specifications are met based on the second temperature value;
retrieving thermal table data from a thermal table;
in response to the acoustic level not being met:
when the first temperature value is received, generating first and second fan control signals based on the first and second temperature values and the thermal table data; and
when the first temperature value is not received, generating the first and second fan control signals based on the second temperature value and the thermal table data;
providing the first fan control signal to the dock via a vendor defined message, wherein a first fan speed for a first cooling fan of the dock is set based on the first fan control signal, wherein based on the first fan control signal, the processor remotely controls an amount of cooling provided to the information handling system by a first airflow of a first cooling fan in the dock;
generating the second fan control signals based on the first and second temperature values and the thermal table data;
based on the second fan control signal setting, by a processor, a second fan speed for the second cooling fan of the information handling system; and
providing, by the second cooling fan, a second airflow based on the second fan control signal, wherein the first and second airflows are provided to the information handling system without the acoustic level being exceeded.

16. The method of claim 15, wherein the first fan speed of the first cooling fan and the second fan speed of the second cooling fan combine to provide a total amount of cooling needed based on a thermal design power of the information handling system.

17. The method of claim 15, wherein a dock temperature request is provided to the dock via a power delivery port of a universal serial bus type-c connection.

18. The method of claim 17, wherein the communication signals include the dock temperature request and the first fan control signal.

* * * * *